United States Patent
Wang et al.

(10) Patent No.: US 12,439,462 B2
(45) Date of Patent: Oct. 7, 2025

(54) COMMUNICATION SYSTEM OF DISPLAY SCREEN, COMMUNICATION METHOD OF DISPLAY SCREEN, AND CABINET

(71) Applicant: SHENZHEN LAMP TECHNOLOGY CO., LTD, Shenzhen (CN)

(72) Inventors: Zhao Wang, Shenzhen (CN); Weiqiang Zhu, Shenzhen (CN)

(73) Assignee: SHENZHEN LAMP TECHNOLOGY CO., LTD, Shenzhen (CN)

( * ) Notice: Subject to any disclaimer, the term of this patent is extended or adjusted under 35 U.S.C. 154(b) by 522 days.

(21) Appl. No.: 17/949,563

(22) Filed: Sep. 21, 2022

(65) Prior Publication Data

US 2023/0015655 A1     Jan. 19, 2023

Related U.S. Application Data

(63) Continuation of application No. PCT/CN2020/125315, filed on Oct. 30, 2020.

(30) Foreign Application Priority Data

Apr. 27, 2020  (CN) .................. 202010346567.X

(51) Int. Cl.
*H04W 76/10*     (2018.01)
*G09G 3/32*      (2016.01)

(52) U.S. Cl.
CPC .............. *H04W 76/10* (2018.02); *G09G 3/32* (2013.01); *G09G 2370/02* (2013.01); *G09G 2370/16* (2013.01)

(58) Field of Classification Search
CPC ........ H04W 76/10; H04W 76/40; G09G 3/32; G09G 2370/02; G09G 2370/16; G09G 2300/026; G06F 3/1446; Y02D 30/70
See application file for complete search history.

(56) References Cited

U.S. PATENT DOCUMENTS

2005/0289631 A1   12/2005   Shoemake
2022/0114987 A1*   4/2022   Liu .................... G09G 5/12

FOREIGN PATENT DOCUMENTS

| CN | 102542986 A | 7/2012 |
| CN | 102737616 A | 10/2012 |
| CN | 202905116 U | 4/2013 |
| CN | 104157245 A | 11/2014 |
| CN | 105573704 A | 5/2016 |
| CN | 105741810 A | 7/2016 |

(Continued)

OTHER PUBLICATIONS

First Office Action issued in counterpart Chinese Patent Application No. 202010346567.X, dated Mar. 25, 2022.

(Continued)

*Primary Examiner* — Michael A Keller
(74) *Attorney, Agent, or Firm* — Westbridge IP LLC

(57) ABSTRACT

Disclosed are a communication system of a display screen, a communication method of a display screen, and a cabinet. The communication system includes a signal station, and a display screen spliced by a plurality of cabinets. The signal station and the plurality of cabinets form a star-shaped communication structure to establish a wireless communication connection for wireless signal transmission of information, and a wireless signal is transmitted wirelessly between the plurality of cabinets.

12 Claims, 3 Drawing Sheets

(56) References Cited

FOREIGN PATENT DOCUMENTS

| CN | 106328046 A | | 1/2017 | | |
|---|---|---|---|---|---|
| CN | 106708455 A | * | 5/2017 | | |
| WO | WO-2013123696 A1 | * | 8/2013 | ........... | G06F 3/1446 |

OTHER PUBLICATIONS

International Search Report and Written Opinion issued in corresponding PCT Application No. PCT/CN2020/125315, dated Jan. 8, 2021.
Second Office Action issued in counterpart Chinese Patent Application No. 202010346567.X, dated Sep. 28, 2022.

* cited by examiner

COMMUNICATION SYSTEM OF DISPLAY SCREEN, COMMUNICATION METHOD OF DISPLAY SCREEN, AND CABINET

CROSS-REFERENCE TO RELATED APPLICATIONS

This application is a continuation application of International Application No. PCT/CN2020/125315, filed on Oct. 30, 2020, which claims priority to Chinese Patent Application No. 202010346567.X, filed on Apr. 27, 2020. The disclosures of the above-mentioned applications are incorporated herein by reference in their entireties.

TECHNICAL FIELD

The present disclosure relates to the field of display screens, in particular to a communication system of a display screen, a communication method of a display screen, and a cabinet.

BACKGROUND

The signal transmission has always been an important factor that affects further thinning of existing large-scale display screens.

The display screen is formed by splicing multiple cabinets, the cabinet is formed by splicing multiple display modules, and the module printed circuit board (PCB) contains control-driven ICs. The cabinet needs to play video information. In the related art, the video information needs to be sent through the sending card, and received by the receiving card in the cabinet. After the receiving card receives the video information, the video information is sent to each module through the cable. Different cabinets are connected through network cables. Video signals are transmitted between different cabinets through network cables. Thus, the video signal can realize the transmission between different modules and realize the transmission between different cabinets, which is also the signal transmission process of the existing display screen.

The above signal transmission methods have the following problems.

Firstly, the cable connection between the modules will occupy a lot of space inside the cabinet, which is not conducive to the thinning of the screen.

Secondly, the cable connection between the modules and the network cable connection between the cabinets are complicated, which is not conducive to disassembly and maintenance, and is prone to open circuit due to poor contact, thereby affecting the stability of the cabinet.

Thirdly, the network cable connection between the cabinets requires an open channel between the cabinets to supply the cable, which is not conducive to the sealing of the cabinet.

Fourthly, signal control and system debugging based on this communication system are more complicated. Not only parameter settings and path settings, or the like at the software level are required, but also a variety of factors such as line connection, cabinet location, wiring method, and wiring location at the hardware level are considered.

Lastly, the multi-channel serial port wiring has high requirements on the environment, and requires the cabinet to have good air tightness and waterproof performance.

Therefore, it is necessary to provide a new communication transmission method of the display screen to solve the above-mentioned technical problems.

SUMMARY

In view of this, the present disclosure provides a communication system of a display screen, a communication method of a display screen, and a cabinet, which aims to solve the problem of the complex structure of the display screen.

According to an aspect of the present disclosure, the present disclosure provides a communication system of a display screen, including: a signal station, and a display screen spliced by a plurality of cabinets. The signal station and the plurality of cabinets form a star-shaped communication structure to establish a wireless communication connection for wireless signal transmission of information, and wireless signal is transmitted wirelessly between the plurality of cabinets.

According to another aspect of the present disclosure, the present disclosure provides a communication method of a display screen, applied to a signal station, and the method includes: obtaining, by the signal station, initialization information of a cabinet of a display screen, and establishing a wireless communication connection with each cabinet in a star-shaped communication structure; and transmitting wireless signal between each cabinet of the display screen.

According to still another aspect of the present disclosure, the present disclosure provides a communication method of a display screen, applied to a display screen, and the method includes: a plurality of cabinets of the display screen establishing a wireless communication connection with a signal station in a star-shaped communication structure; and transmitting wireless signal between the cabinets.

According to yet another aspect of the present disclosure, the present disclosure provides a communication method of a display screen, applied to a cabinet, and the method includes: obtaining a play coordinate value sent by a signal station; receiving all video information sent by the signal station; and playing video information within a corresponding play range in the all video information according to the play coordinate value.

According to another aspect of the present disclosure, the present disclosure provides a cabinet. The cabinet includes a wireless communication device. The wireless communication device is used for wireless signal communication between the cabinets and between the cabinet and the signal station.

In technical solutions of the present disclosure, the information processing and information transmission of the modules of each cabinet are integrated on one signal station. One signal station drives multiple cabinet modules, and only information reception is reserved on the modules, and only video broadcast and audio broadcast are required, which can further reduce the thickness of the display screen. Since the signal station and several cabinets form a star-shaped communication structure, even if one of the cabinets fails, the normal operation of other cabinets will not be affected, and the stability is high.

DETAILED DESCRIPTION OF THE EMBODIMENTS

The realization of the objective, functional characteristics, and advantages of the present disclosure are further described with reference to the accompanying drawings.

In order to make the technical problems, technical solutions and beneficial effects to be solved by the present disclosure clearer and more comprehensible, the present disclosure will be further described in detail below with reference to the accompanying drawings and embodiments. It should be understood that the specific embodiments described herein are only for explaining the present disclosure, but not for limiting the present disclosure.

In the subsequent description, suffixes such as "module", "component" or "unit" used to represent elements are only to facilitate the description of the present disclosure, and have no specific meaning per se. Thus, "module", "component" or "unit" may be used interchangeably.

Figure 1:
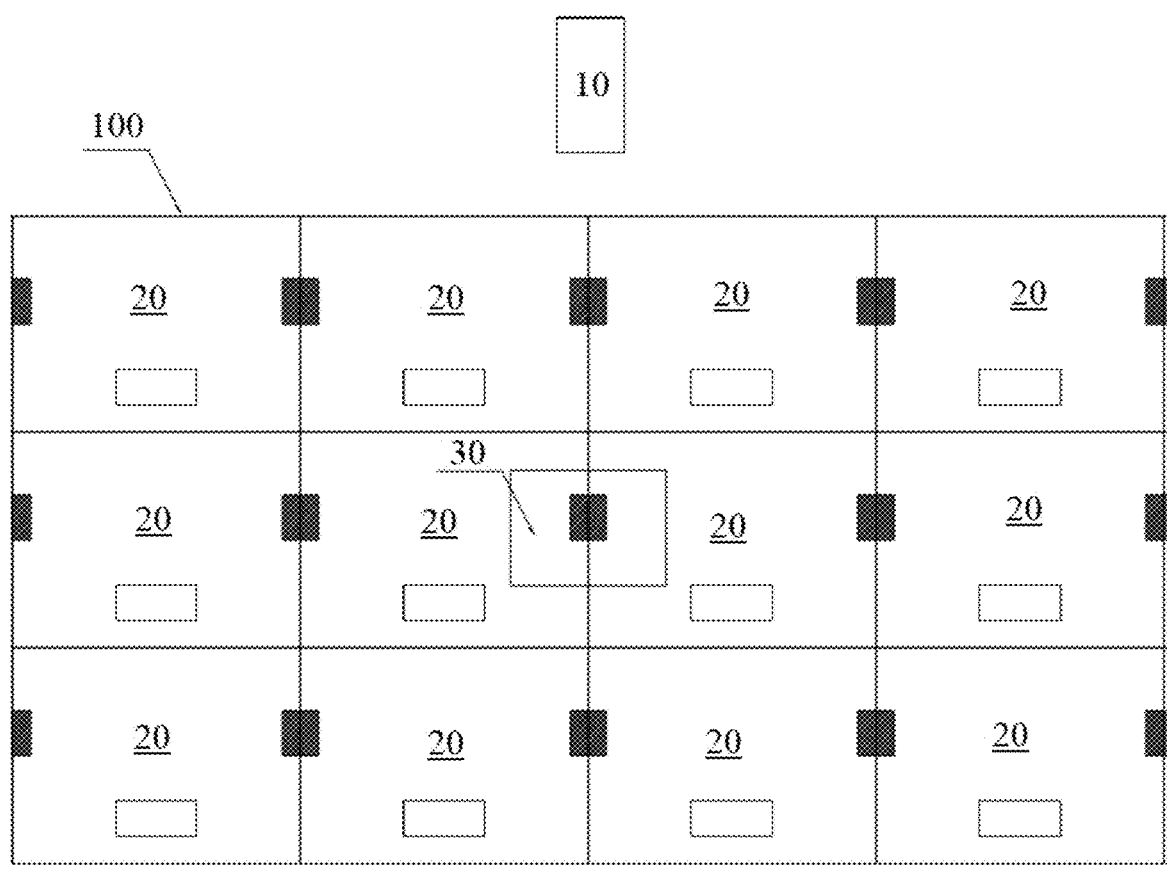
FIG. 1 is a schematic structural diagram of a communication system of a display screen according to an embodiment of the present disclosure.

In an embodiment, as shown in FIG. 1, the present disclosure provides a communication system of a display screen. The communication system includes a signal station 10, and a display screen 100 spliced by the plurality of cabinets 20. The signal station 10 and the plurality of cabinets 20 form a star-shaped communication structure to establish a wireless communication connection for wireless signal transmission of information. The signal station 10 drives the plurality of cabinets 20. Wireless signal is transmitted wirelessly between the plurality of cabinets 20. The information includes one or any of control information, video information, position information of the cabinet, and play coordinate values of the cabinet.

In this embodiment, the display screen is formed by splicing multiple cabinets, the cabinet is formed by splicing multiple display modules, each cabinet is a broadcast unit, and each cabinet can play video and audio. The display screen communication system applies wireless connection related technology. One signal station uniformly transmits wireless signals including control information, video information, location information and other required information to multiple cabinets, and the cabinet does not need to use cables, network cables and other similar structures for signal transmission. The use of wireless connection for video signal transmission saves space in the cabinet, the cabinet structure is simpler and thinner, and the cabinet control circuit and control logic are simplified, ensuring smoother, more timely and more convenient communication. The wireless connection omits a large number of serial ports, which further simplifies the information communication channel and connection method of the display screen, which is conducive to disassembly and maintenance.

In an embodiment, the display screen 100 is a light-emitting diode (LED) display screen, and the cabinet 20 is an LED cabinet.

In an embodiment, the signal station 10 and a plurality of cabinets 20 form a star-shaped communication structure to establish a wireless communication connection for wireless signal transmission of information.

The signal station 10 integrates the original information processing and information transmission of the module in the cabinet 20, has the functions of information transmission and information processing, and realizes the original information transmission and information processing of the module in the cabinet 20. The module of the cabinet 20 only retains information reception, and realizes video broadcast and audio broadcast only by receiving information.

The signal station 10 and the plurality of cabinets 20 form a star-shaped communication structure, and wireless signals are uniformly transmitted to the plurality of cabinets 20 through the signal station 10.

In this embodiment, the information processing and information transmission of the modules of each cabinet are integrated on one signal station. Only information reception is retained on the module, and only video broadcast and audio broadcast are required. Information transmission, information processing (such as information reception, coding, amplification and storage) are integrated on one signal station, and multiple cabinet modules are driven through one signal station. Meanwhile, signals are uniformly transmitted to the plurality of cabinets through one signal station. Because the signal station and the plurality of cabinets form a star-shaped communication structure instead of a series structure, even if one of the cabinets fails, it will not affect the normal operation of the other cabinets, thereby achieving a more stable display effect.

In an embodiment, the wireless transmission communication technology includes at least one of the following: Light Fidelity (LiFi, visible light wireless communication or optical fidelity technology) form or Wireless Fidelity (WiFi) form for wireless signal transmission.

It should be noted that the wireless transmission communication technology of the present disclosure is not limited to the above-mentioned two wireless transmission technologies, and all technologies capable of transmitting information by wireless signals are covered within this scope.

Figure 2:
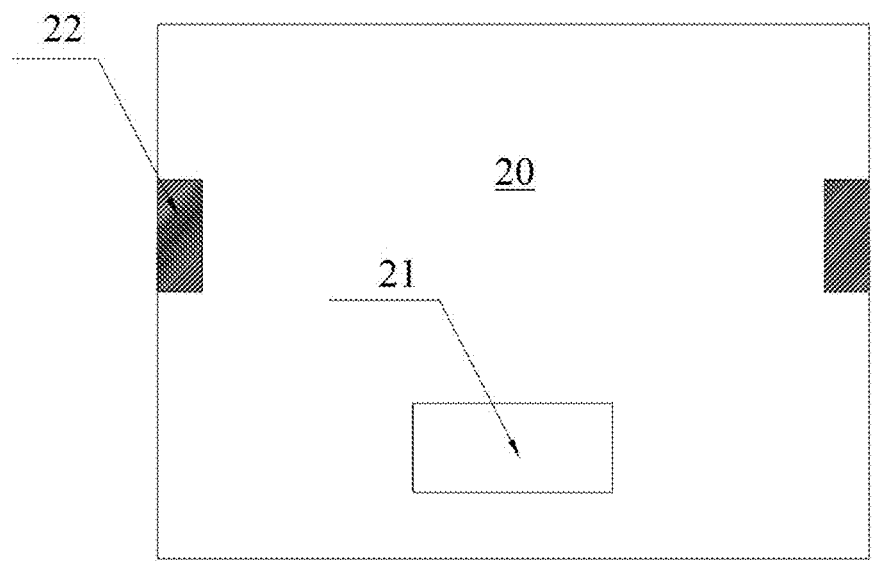
FIG. 2 is a schematic structural diagram of a cabinet according to an embodiment of the present disclosure.

In an embodiment, as shown in FIG. 2, the cabinet 20 includes a wireless communication device 21, and the wireless communication device 21 is used for wireless signal communication between the cabinets 20, and between the cabinet 20 and the signal station 10.

As shown in FIG. 1 and FIG. 2, the cabinet 20 includes a power transmission device 22. The power transmission device 22 is used for power transmission with the power supply device 30 disposed in the center of the display screen 100 to provide power for the cabinet 20 and the wireless communication device 21.

The power transmission device includes a soft connection form, a hard connection form, a wired or wireless form, etc., and is provided on the edge of the cabinet. Under the condition of ensuring the good sealing performance of the cabinet, the structure of the cabinet is simple and thin, and the control logic and wiring logic of the system can be simplified.

In an embodiment, the cabinet 20 includes a cabinet code, and the cabinet code is configured to identify the cabinet. The cabinet 20 has a unique cabinet code when it leaves the factory, and the cabinet code is unique in the entire display screen 100 that supports wireless transmission.

In this embodiment, there is no need to establish a tight connection between the cabinets. Since the wireless communication device is used for wireless signal communication between the cabinets and between the cabinet and the signal station. The power-on form between the cabinets can be changed to the form of hard connection in the cabinet frame. The seam at the edge of the cabinet is adjustable without affecting the signal and power supply, so the cabinets do not need to be tightly connected. The splicing between the cabinets can be completed only through the buckle and other devices. There is no wiring and no openings at all, and it is easy to disassemble and assemble.

The present disclosure further provides a display screen communication method, applied to a signal station of the above-mentioned wireless communication system, and the method includes:

obtaining, by the signal station, initialization information of a cabinet of a display screen, and establishing a wireless communication connection with each cabinet in a star-shaped communication structure; and transmitting wireless signal between each cabinet of the display screen.

In an embodiment, establishing, by the signal station, a wireless communication connection with the cabinets in a star-shaped communication structure includes: establishing, by the signal station, an initialization wireless communication connection with the cabinets in a star-shaped communication structure.

In an embodiment, establishing, by the signal station, the initialization wireless communication connection with the cabinets in a star-shaped communication structure includes at least one of the following methods to establish the initialization wireless communication connection.

The signal station obtains the initialization information of the cabinet of the display screen manually, and establishes an initialization wireless communication connection.

The signal station receives the initialization information of the cabinet that is manually entered into the display screen, and the initialization information includes: the number of cabinets, the cabinet code, and the installation position of the cabinet.

After the signal station acquires the initialization information of the cabinet of the display screen, according to the corresponding order represented by the cabinet code, the display screen is divided into play areas, and the play coordinate value is allocated to each cabinet spliced into the display screen.

Thus, the signal station establishes the initialization wireless communication connection with several cabinets. Subsequently, the signal station sends all the video information to the cabinet according to the established initialization wireless communication connection. The cabinet receives all the video information sent by the signal station, and outputs the video information at the corresponding position according to the play coordinate value of the broadcast area. In addition, during the communication process, since the signal station retains the initialization information of each cabinet, it can be compared with the feedback information of the cabinet to detect whether the cabinet is faulty or not responding.

Although it is troublesome to manually enter the initialization information of the cabinet to the signal station, it can avoid the problem of possible signal conflict. That is to say, it is possible to avoid the problem that the signal station may communicate and instruct the two cabinets at the same time, which affects the overall control logic and is prone to errors.

The signal station obtains the initialization information of the cabinet of the display screen automatically, and establishes the initialization wireless communication connection.

Under the working state, the simple information communication is carried out between the cabinets, the communication results are transmitted to the signal station, such that the signal station automatically obtains the initialization information of the cabinet, and establishes an initialization wireless communication connection. The initialization information includes: the number of cabinets, the cabinet code, and the installation position of the cabinet.

The signal station labels the cabinet of the display screen.

When the cabinets are spliced into the display screen, the signal station issues a "counting" command. Before responding to the counting command from the signal station, each cabinet generates a delay response value according to its own cabinet code and a preset compilation rule, and responds to the signal station command according to the delay response value. Since the cabinet code of each cabinet is unique, the generated delay response value is also unique. For the entire display screen, there will be no conflict between the delay response values of the two cabinets. When the cabinet and the signal station communicate with each other, there is only one cabinet to communicate with the signal station, to avoid the problem of possible signal conflict. That is, it can avoid the problem that the signal station may communicate and command two or more cabinets at the same time, which affects the overall control logic and is prone to errors.

There is a signal exchange between the cabinets of the entire display screen. According to the delay response value of each cabinet, the response priority of responding to the counting command from the signal station is determined according to the preset sorting rule and the cabinet with the first response priority is determined, so that each cabinet knows its own response priority. In an embodiment, the preset sorting rule is to sort the delay response values from small to large, and the smaller the delay response value, the higher the response priority.

The cabinets respond to the signal station commands successively according to the determined response priority. The cabinet with the first response priority responds preferentially to the counting command from the signal station. If the cabinet with the first response priority cannot respond to the command from the signal station, that is, the signal station cannot read the cabinet information under this response priority. It is determined that the cabinet with the first response priority is faulty, the priority is modified to the next response priority, and the cabinet with the next response priority responds until all the cabinets with the determined response priority respond to the signal station command.

The signal station automatically acquires the initialization information of the cabinet according to the response of the cabinet, and labels the cabinet of the display screen.

The signal station receives a signal from the cabinet according to the response priority in response to the command from the signal station, and establishes an information exchange channel with the cabinet.

The signal station sends a "standby" command to the remaining unresponsive cabinets, and the remaining unresponsive cabinets wait for further commands from the signal station.

The signal station performs the following information exchange with the cabinet through the established information exchange channel.

The signal station receives the cabinet code fed back by the cabinet.

A label value is sent to the cabinet, and the label value establishes a unique corresponding relationship with the cabinet code.

A sleep command is sent to the cabinet, and the cabinet do not respond to any other form of command from the signal station when the "start cabinet" command is not received.

Then, the signal station will output the "counting" command again. At this time, the cabinet with the first response priority will enter the sleep mode and will not respond to the signal station command, and the cabinet that originally had the second response priority will become the highest priority cabinet, and will respond to the signal station, and the above operations will be repeated.

Through the above operations, for the entire display screen, the cabinets will receive the response commands from the signal station one by one, and will be labeled by the signal station. After the last cabinet in the entire display screen is also labeled, when the signal station sends a response command, no cabinet will respond again, and the signal station will enter the next working mode of starting the cabinet.

The signal station obtains the physical installation position of the cabinet according to the label information of the cabinet of the display screen.

The label information of the surrounding cabinets is received.

The signal station will issue a "start cabinet" command to all cabinets. The cabinet of the entire display screen is started according to the start cabinet command. After startup, the cabinet performs the power-on self-check process.

Check whether the startup state of the cabinet is normal.

Detect the label value on the signal station and the relay response value.

Detect the label value of the surrounding cabinet and record the label value.

After the above power-on self-check process is completed, the cabinet enters the standby state and responds to the command of the signal station at this time.

Through the above power-on self-check process, the cabinet can not only detect its own state, but also detect and record the label value of the surrounding cabinets, so that the label information of the surrounding cabinets can be counted.

The signal station receives the label information of the cabinet one by one.

The signal station sends the "start cabinet" command to all cabinets, initiates signal communication with the cabinets, and acquires the label information of the cabinet and the label information of the surrounding cabinets.

The signal station sends an "inquiry" command to the first cabinet marked with a label value, and waits for the cabinet to respond.

The cabinet to be inquired responds to the "inquiry" command from the signal station immediately when it enters the standby state. When the cabinet to be inquired responds to the inquiry command from the signal station, the cabinet communicates the following information with the signal station through the established information exchange channel.

The cabinet feeds back the label value of the cabinet and the label values of the surrounding cabinets to the signal station.

After receiving the label information sent by the cabinet, the signal station sends a sleep command to the cabinet, and does not respond to any other form of commands from the signal station when the "start cabinet" command is not received.

After sending the sleep command to the first cabinet, the signal station will continue to inquire the second cabinet until the second cabinet responds, the signal station receives the label information of the second cabinet and the label information of its surrounding cabinets, then sleeps the second cabinet, and inquires the third cabinet, and so on, inquires all the cabinets, and sleeps all the cabinets, until the signal station acquires the label information of the cabinet and the label information of the surrounding cabinets.

The signal station fits all the obtained label information to obtain the physical installation position of the cabinet on the display screen corresponding to the label information.

After the signal station has acquired the label information of all the cabinets and the label information of the surrounding cabinets, all the acquired labels are fitted through a preset fitting algorithm, to obtain the physical installation position information of the cabinet corresponding to each label in the entire display screen.

The signal station assigns play coordinate values to the cabinet of the display screen according to the physical installation position of the cabinet of the display screen.

After the signal station obtains the physical installation position information of the cabinet corresponding to each label in the entire display screen, the display area is divided according to the entire display screen and the number of labels, and the size of the divided area is the size of the cabinet.

The signal station encodes each cabinet, and sequentially assigns a play coordinate value to each cabinet, and the play coordinate value corresponds to the display range of the cabinet. A cabinet label corresponds to two determined coordinate values.

The signal station sends the play coordinate value of the cabinet to the cabinet one by one.

After the signal station completes the coding of each cabinet and assigns the play coordinate value, the signal station outputs the "start cabinet" command to all cabinets.

After receiving the instruction to start the cabinet, the cabinet performs a power-on self-check process, and enters a standby state after the power-on self-check process is completed.

After sending out the "start cabinet" command, the signal station sequentially initiates signal exchanges for assigning play coordinates to the cabinet, and assigns play coordinates to the cabinet.

The signal station sends an "assignment" command to a first cabinet.

The first cabinet will not respond to the assignment command in time when it is in the power-on self-check process. However, when the power-on self-check process ends and the first cabinet enters the standby state, it will respond to the assignment command immediately, and the cabinet will exchange the following information with the signal station through the established information exchange channel.

The cabinet transmits the own cabinet code information to the signal station.

After confirming that the received cabinet code is correct, the signal station sends the play coordinate value information corresponding to the cabinet code to the cabinet.

The signal station inputs a sleep command to the cabinet.

So far, the signal station has finished assigning the play coordinate value to the first cabinet.

According to the above process, a corresponding play coordinate value is assigned to each subsequent cabinet.

When the signal station sends out the "assignment" command, and there is no cabinet to respond to the "assignment" command from the signal station, it means that the signal station has completed the assignment to all the cabinets, or it is only determined according to the program judgment that the assignment to all the cabinets has been completed.

In an embodiment, the signal station and the plurality of cabinets form a star-shaped communication structure to establish a wireless communication connection for wireless signal transmission of information.

The signal station sends all video information to all cabinets according to the established initialization wireless communication connection.

Specifically, according to the established initialization wireless communication connection, the signal station outputs a "start cabinet" command to all the cabinets.

The cabinet enters the power-on self-check process according to the start cabinet command, and enters a standby state.

The signal station sends out the "full screen sending and receiving" command to all cabinets, and inputs the following commands to all cabinets:

Read its own play coordinate value.

The video information to be played is the video information covered by the play coordinate value.

Start receiving broadcast video information.

The above commands are sent out late one by one, and the delay interval can be pre-agreed as required. The above commands do not require any feedback from the cabinet.

After the above-mentioned command is issued and the preset delay interval expires, the signal station starts to send video information to the entire cabinet.

The cabinet receives all the video information sent by the signal station, determines the play range according to the play coordinate value, and only plays the video information within the determined play coordinate value range.

It should be emphasized that the cabinet does not respond to the signal station, that is, when the cabinet fails, there will be different degrees of non-response: no response to signal station commands, no response to cabinet communication in a single direction, no response to cabinet communication in multiple directions, and no response at all.

When the cabinet does not respond to the communication of the signal station, it can be identified through the process of "counting the label information of other cabinets around the cabinet". When this cabinet does not respond to the command from the signal station, the signal station will skip this cabinet and mark the next cabinet, so the faulty cabinet does not have label information.

If the cabinet can communicate with other cabinet in at least one direction, the cabinet that has not been marked by the signal station can be identified. The signal station can identify the fault of the cabinet through the cabinets around the faulty cabinet, and determine the specific location of the faulty cabinet.

If the cabinet does not respond at all, it means that the surrounding cabinets cannot read any information from the faulty cabinet at all. For the entire screen and signal station, this cabinet does not exist. However, in the screen fitted by the signal station, since no information can be read in this area, that is, for the cabinets around the faulty cabinet, the information facing the side of the faulty cabinet is missing, so the play coordinate values will be different.

Figure 3:
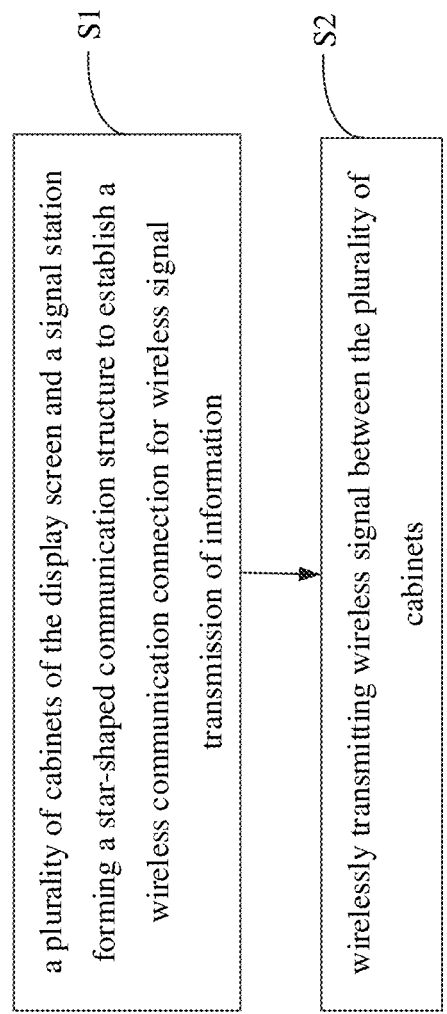
FIG. 3 is a schematic flowchart of a communication system of a display screen according to an embodiment of the present disclosure.

In an embodiment, as shown in FIG. 3, the present disclosure provides a display screen communication method, applied to the display screen of the above-mentioned display screen communication system, and the method includes:

S1, a plurality of cabinets of the display screen and a signal station forming a star-shaped communication structure to establish a wireless communication connection for wireless signal transmission of information.

S2, wirelessly transmitting wireless signal between the plurality of cabinets.

The display screen communication system applies wireless connection technology, and transmits wireless signals to multiple cabinets through a single signal station. The information includes, but is not limited to, control information, video information, position information of the cabinet, play coordinate information of the cabinet, and the like, and one or any combination of information required. The signal station integrates the original information processing and information transmission of the module in the cabinet, has the functions of information transmission and information processing, and realizes the original information transmission and information processing of the module in the cabinet. The module of the cabinet only retains information reception, and realizes video broadcast and audio broadcast only by receiving information.

In this embodiment, the information processing and information transmission of the modules of each cabinet are integrated on one signal station, only information reception is reserved on the module, and only video broadcast and audio broadcast are required. Information transmission, information processing (such as information acceptance, coding, amplification and storage) are integrated on one signal station, and signal transmission is carried out to multiple cabinets through one signal station. Since the signal station and several cabinets form a star-shaped communication structure instead of a series structure, even if one of the cabinets fails, it will not affect the normal operation of other cabinets, thereby achieving a more stable display effect. In an embodiment, the wireless transmission communication technology includes at least one of the following: LiFi or WiFi to perform wireless signal transmission.

It should be noted that the wireless transmission communication technology of the present disclosure is not limited to the above-mentioned two wireless transmission technologies, and all technologies capable of transmitting information by wireless signals are covered within this scope.

In an embodiment, the cabinet includes a wireless communication device; the cabinet establishes a wireless communication connection with the signal station through the wireless communication device, and performs wireless signal transmission. Wireless signal transmission is performed between the cabinets through the wireless communication device.

The cabinet includes a cabinet code, and the cabinet code is configured to identify the cabinet. The cabinet will have a unique cabinet code when it leaves the factory, and the cabinet code is unique in the entire display screen that supports wireless transmission. The operation S1 includes: a plurality of cabinets of the display screen and a signal station form a star-shaped communication structure to establish an initialization wireless communication connection. The initialization wireless communication connection is established through the following ways.

The signal station obtains the initialization information of all the cabinets of the display screen manually, and establishes the initialization wireless communication connection. The initialization information of all cabinets manually entered into the display screen is received. The initialization information includes: the number of cabinets, the cabinet code, and the coordinates of the installation position of the cabinet.

After obtaining the initialization information of all the cabinets of the display screen, according to the corresponding order represented by the cabinet codes, each cabinet is divided into the play area of the display screen, and the play coordinate value is assigned to each cabinet.

The signal station establishes an initialization wireless communication connection with several cabinets. The signal station sends all video information to all cabinets according to the established initialization wireless communication connection. The cabinet receives all the video information sent by the signal station, and outputs only the video information at the corresponding position according to its own play coordinate value (play area). In addition, during the communication process of the signal station, since the initialization information of each cabinet is retained, it can be compared with the feedback information of the cabinet to detect whether the cabinet is faulty or not responding.

The signal station obtains the initialization information of the cabinet of the display screen automatically, and establishes an initialization wireless communication connection.

Under this working mode, simple information communication is carried out between the cabinets, and the communication results are transmitted to the signal station, so that the signal station can automatically obtain the initialization information of the cabinet and establish an initialization wireless communication connection. The initialization information includes: the number of cabinets, the cabinet code, and the coordinates of the installation position of the cabinet.

The signal station labels the cabinet of the display screen.

When the cabinets are spliced into the display screen, the signal station issues a "counting" command.

Before responding to the counting command from the signal station, each cabinet generates a delay response value according to its own cabinet code and a preset compilation rule, and responds to the signal station command according to the delay response value. Since the cabinet code of each cabinet is unique, the generated delay response value is also unique. For the entire display screen, there will be no conflict between the delay response values of the two cabinets. When the cabinet and the signal station communicate with each other, there is only one cabinet to communicate with the signal station, to avoid the problem of possible signal conflict. That is, it can avoid the problem that the signal station may communicate and command two or more cabinets at the same time, which affects the overall control logic and is prone to errors.

There is a signal exchange between the cabinets of the entire display screen. According to the delay response value of each cabinet, the response priority of responding to the counting command from the signal station is determined according to the preset sorting rule and the cabinet with the first response priority is determined, so that each cabinet knows its own response priority. In an embodiment, the preset sorting rule is to sort the delay response values from small to large, and the smaller the delay response value, the higher the response priority.

The cabinets respond to the signal station commands successively according to the determined response priority. The cabinet with the first response priority responds preferentially to the counting command from the signal station. If the cabinet with the first response priority cannot respond to the command from the signal station, that is, the signal station cannot read the cabinet information under this response priority. It is determined that the cabinet with the first response priority is faulty, the priority is modified to the next response priority, and the cabinet with the next response priority responds until all the cabinets with the determined response priority respond to the signal station command.

The signal station automatically acquires the initialization information of the cabinet according to the response of the cabinet, and labels the cabinet of the display screen.

The signal station receives a signal from the cabinet according to the response priority in response to the command from the signal station, and establishes an information exchange channel with the cabinet.

The signal station sends a "standby" command to the remaining unresponsive cabinets, and the remaining unresponsive cabinets wait for further commands from the signal station.

The signal station performs the following information exchange with the cabinet through the established information exchange channel.

The cabinet outputs its own cabinet code to the signal station.

The signal station transmits a label value to the cabinet, and the label value establishes a unique corresponding relationship with the cabinet code.

The signal station sends a sleep command to the cabinet, and when the "start cabinet" command is not received, the cabinet does not respond to any other form of command from the signal station.

Then, the signal station will output the "counting" command again. At this time, the cabinet with the first response priority will enter the sleep mode and will not respond to the signal station command, and the cabinet that originally had the second response priority will become the highest priority cabinet, and will respond to the signal station, and the above operations will be repeated.

Through the above operations, for the entire display screen, the cabinets will receive the response commands from the signal station one by one, and will be labeled by the signal station. After the last cabinet in the entire display screen is also labeled, when the signal station sends a response command, no cabinet will respond again, and the signal station will enter the next working mode of starting the cabinet.

The signal station obtains the physical installation position of the cabinet according to the label information of the cabinet of the display screen.

The label information of surrounding cabinets is counted.

The signal station will issue a "start cabinet" command to all cabinets.

The cabinet of the entire display screen is started according to the start cabinet command. After startup, the cabinet performs the power-on self-check process.

Check whether the startup state of the cabinet is normal.

Detect the label value on the signal station and the relay response value.

Detect the label value of the surrounding cabinet and record the label value.

After the above power-on self-check process is completed, the cabinet enters the standby state and responds to the command of the signal station at this time.

Through the above power-on self-check process, the cabinet can not only detect its own state, but also detect and record the label value of the surrounding cabinets, so that the label information of the surrounding cabinets can be counted.

The signal station receives the label information of the cabinet one by one.

The signal station sends the "start cabinet" command to all cabinets, initiates signal communication with the cabinets, and acquires the label information of the cabinet and the label information of the surrounding cabinets.

The signal station sends an "inquiry" command to the first cabinet marked with a label value, and waits for the cabinet to respond.

The cabinet to be inquired responds to the "inquiry" command from the signal station immediately when it enters the standby state. When the cabinet to be inquired responds to the inquiry command from the signal station, the cabinet communicates the following information with the signal station through the established information exchange channel.

The cabinet feeds back the label value of the cabinet and the label values of the surrounding cabinets to the signal station.

After receiving the label information sent by the cabinet, the signal station sends a sleep command to the cabinet, and does not respond to any other form of commands from the signal station when the "start cabinet" command is not received.

After sending the sleep command to the first cabinet, the signal station will continue to inquire the second cabinet until the second cabinet responds, the signal station receives the label information of the second cabinet and the label information of its surrounding cabinets, then sleeps the second cabinet, and inquires the third cabinet, and so on, inquires all the cabinets, and sleeps all the cabinets, until the signal station acquires the label information of the cabinet and the label information of the surrounding cabinets.

The signal station fits all the obtained label information to obtain the physical installation position of the cabinet on the display screen corresponding to the label information.

After the signal station has acquired the label information of all the cabinets and the label information of the surrounding cabinets, all the acquired labels are fitted through a preset fitting algorithm, to obtain the physical installation position information of the cabinet corresponding to each label in the entire display screen.

The signal station assigns play coordinate values to the cabinet of the display screen according to the physical installation position of the cabinet of the display screen.

After the signal station obtains the physical installation position information of the cabinet corresponding to each label in the entire display screen, the display area is divided according to the entire display screen and the number of labels, and the size of the divided area is the size of the cabinet.

The signal station encodes each cabinet, and sequentially assigns a play coordinate value to each cabinet, and the play coordinate value corresponds to the display range of the cabinet. A cabinet label corresponds to two determined coordinate values.

The signal station sends the play coordinate value of the cabinet to the cabinet one by one.

After the signal station completes the coding of each cabinet and assigns the play coordinate value, the signal station outputs the "start cabinet" command to all cabinets.

After receiving the instruction to start the cabinet, the cabinet performs a power-on self-check process, and enters a standby state after the power-on self-check process is completed.

After sending out the "start cabinet" command, the signal station sequentially initiates signal exchanges for assigning play coordinates to the cabinet, and assigns play coordinates to the cabinet.

The signal station sends an "assignment" command to a first cabinet.

The first cabinet will not respond to the assignment command in time when it is in the power-on self-check process. However, when the power-on self-check process ends and the first cabinet enters the standby state, it will respond to the assignment command immediately, and the cabinet will exchange the following information with the signal station through the established information exchange channel.

The cabinet transmits the own cabinet code information to the signal station.

After confirming that the received cabinet code is correct, the signal station sends the play coordinate value information corresponding to the cabinet code to the cabinet.

The signal station inputs a sleep command to the cabinet.

So far, the signal station has finished assigning the play coordinate value to the first cabinet.

According to the above process, a corresponding play coordinate value is assigned to each subsequent cabinet.

When the signal station sends out the "assignment" command, and there is no cabinet to respond to the "assignment" command from the signal station, it means that the signal station has completed the assignment to all the cabinets, or it is only determined according to the program judgment that the assignment to all the cabinets has been completed.

In an embodiment, the signal station and the plurality of cabinets form a star-shaped communication structure to establish a wireless communication connection for wireless signal transmission of information.

The signal station sends all video information to all cabinets according to the established initialization wireless communication connection.

According to the established initialization wireless communication connection, the signal station outputs a "start cabinet" command to all the cabinets.

The cabinet enters the power-on self-check process according to the start cabinet command, and enters a standby state.

The signal station sends out the "full screen sending and receiving" command to all cabinets, and inputs the following commands to all cabinets:

Read its own play coordinate value.

The video information to be played is the video information covered by the play coordinate value.

Start receiving broadcast video information.

The above commands are sent out late one by one, and the delay interval can be pre-agreed as required. The above commands do not require any feedback from the cabinet.

After the above-mentioned command is issued and the preset delay interval expires, the signal station starts to send video information to the entire cabinet.

The cabinet receives all the video information sent by the signal station, determines the play range according to the play coordinate value, and only plays the video information within the determined play coordinate value range.

It should be noted that the above method embodiments and system embodiments belong to the same concept, and the specific implementation process is detailed in the system embodiments, and the technical features in the system embodiments are all applicable in the method embodiments, which will not be repeated here.

The technical solution of the present disclosure is further described below with a specific embodiment.

In an embodiment, as shown in FIG. 1 and FIG. 2, the present disclosure provides an LED display screen communication system. In this embodiment, the display screen is the LED display screen, the wireless transmission technology uses WiFi for wireless signal transmission, and the signal station automatically obtains the initialization information of the cabinet of the display screen to establish an initialization wireless communication connection.

In this embodiment, the LED display screen communication system includes a signal station 10 and an LED display screen 100 spliced by a plurality of cabinets 20. The signal station 10 and the plurality of cabinets 20 form a star-shaped communication structure to establish a WiFi wireless communication connection. The signal station 10 drives a plurality of the cabinets 20, and the signal station 10 uniformly transmits wireless signals to the cabinets 20. Wireless signal is transmitted wirelessly between the plurality of cabinets 20. The information includes one or any combination of control information, video information, position information of the cabinet, and play coordinate values of the cabinet.

The LED display screen is spliced by a plurality of cabinets. The cabinet is spliced by a plurality of LED display modules. Each cabinet is a play unit, and each cabinet can play video and audio. The signal station integrates the original information processing and information transmission of the module in the cabinet, has the functions of information transmission and information processing, and realizes the original information transmission and information processing of the module in the cabinet. The module of the cabinet only retains information reception, and realizes video broadcast and audio broadcast only by receiving information.

The cabinet 20 includes a wireless communication device 21 and a power transmission device 22. The wireless communication device 21 is used for wireless signal communication between the cabinets 20 and between the cabinet 20 and the signal station 10. The power transmission device 22 is used for wireless power transmission with the power supply device 30 disposed in the center of the display screen 100 to provide power for the cabinet 20 and the wireless communication device 21.

The cabinet 20 includes a cabinet code, and the cabinet code is configured to identify the cabinet 20. The cabinet 20 has a unique cabinet code when it leaves the factory, and the cabinet code is unique in the entire display screen that supports wireless transmission.

In this embodiment, the signal station obtains the initialization information of the cabinet of the display screen automatically, and establishes an initialization wireless communication connection. Under this working mode, simple information communication is carried out between the cabinets, and the communication results are transmitted to the signal station, so that the signal station can automatically obtain the initialization information of the cabinet and establish an initialization wireless communication connection. The initialization information includes: the number of cabinets, the cabinet code, and the coordinates of the installation position of the cabinet.

The signal station labels the cabinet of the display screen.

When the cabinets are spliced into the display screen, the signal station issues a "counting" command.

Before responding to the counting command from the signal station, each cabinet generates a delay response value according to its own cabinet code and a preset compilation rule, and responds to the signal station command according to the delay response value. There is a signal exchange between the cabinets of the entire display screen. According to the delay response value of each cabinet, the response priority of responding to the counting command from the signal station is determined according to the preset sorting rule and the cabinet with the first response priority is determined, so that each cabinet knows its own response priority. In an embodiment, the preset sorting rule is to sort the delay response values from small to large, and the smaller the delay response value, the higher the response priority.

The cabinets respond to the signal station commands successively according to the determined response priority. The cabinet with the first response priority responds preferentially to the counting command from the signal station. If the cabinet with the first response priority cannot respond to the command from the signal station, that is, the signal station cannot read the cabinet information under this response priority. It is determined that the cabinet with the first response priority is faulty, the priority is modified to the next response priority, and the cabinet with the next response priority responds until all the cabinets with the determined response priority respond to the signal station command.

The signal station automatically acquires the initialization information of the cabinet according to the response of the cabinet, and labels the cabinet of the display screen.

The signal station receives a signal from the cabinet according to the response priority in response to the command from the signal station, and establishes an information exchange channel with the cabinet.

The signal station sends a "standby" command to the remaining unresponsive cabinets, and the remaining unresponsive cabinets wait for further commands from the signal station.

The signal station performs the following information exchange with the cabinet through the established information exchange channel.

The cabinet outputs its own cabinet code to the signal station.

The signal station transmits a label value to the cabinet, and the label value establishes a unique corresponding relationship with the cabinet code.

The signal station sends a sleep command to the cabinet, and when the "start cabinet" command is not received, the cabinet does not respond to any other form of command from the signal station.

Then, the signal station will output the "counting" command again. At this time, the cabinet with the first response priority will enter the sleep mode and will not respond to the signal station command, and the cabinet that originally had the second response priority will become the highest priority cabinet, and will respond to the signal station, and the above operations will be repeated.

Through the above operations, for the entire display screen, the cabinets will receive the response commands from the signal station one by one, and will be labeled by the signal station. After the last cabinet in the entire display screen is also labeled, when the signal station sends a response command, no cabinet will respond again, and the signal station will enter the next working mode of starting the cabinet.

The label information of surrounding cabinets is counted.

The signal station will issue a "start cabinet" command to all cabinets.

The cabinet of the entire display screen is started according to the start cabinet command. After startup, the cabinet performs the power-on self-check process.

Check whether the startup state of the cabinet is normal.

Detect the label value on the signal station and the relay response value.

Detect the label value of the surrounding cabinet and record the label value.

After the above power-on self-check process is completed, the cabinet enters the standby state and responds to the command of the signal station at this time.

Through the above power-on self-check process, the cabinet can not only detect its own state, but also detect and record the label value of the surrounding cabinets, so that the label information of the surrounding cabinets can be counted.

The signal station receives the label information of the cabinet one by one.

The signal station sends the "start cabinet" command to all cabinets, initiates signal communication with the cabinets, and acquires the label information of the cabinet and the label information of the surrounding cabinets.

The signal station sends an "inquiry" command to the first cabinet marked with a label value, and waits for the cabinet to respond.

The cabinet to be inquired responds to the "inquiry" command from the signal station immediately when it enters the standby state. When the cabinet to be inquired responds to the inquiry command from the signal station, the cabinet communicates the following information with the signal station through the established information exchange channel.

The cabinet feeds back the label value of the cabinet and the label values of the surrounding cabinets to the signal station.

After receiving the label information sent by the cabinet, the signal station sends a sleep command to the cabinet, and does not respond to any other form of commands from the signal station when the "start cabinet" command is not received.

After sending the sleep command to the first cabinet, the signal station will continue to inquire the second cabinet until the second cabinet responds, the signal station receives the label information of the second cabinet and the label information of its surrounding cabinets, then sleeps the second cabinet, and inquires the third cabinet, and so on, inquires all the cabinets, and sleeps all the cabinets, until the signal station acquires the label information of the cabinet and the label information of the surrounding cabinets.

The signal station fits all the obtained label information to obtain the physical installation position of the cabinet on the display screen corresponding to the label information.

After the signal station has acquired the label information of all the cabinets and the label information of the surrounding cabinets, all the acquired labels are fitted through a preset fitting algorithm, to obtain the physical installation position information of the cabinet corresponding to each label in the entire display screen.

The signal station assigns play coordinate values to the cabinet of the display screen according to the physical installation position of the cabinet of the display screen.

After the signal station obtains the physical installation position information of the cabinet corresponding to each label in the entire display screen, the display area is divided according to the entire display screen and the number of labels, and the size of the divided area is the size of the cabinet.

The signal station encodes each cabinet, and sequentially assigns a play coordinate value to each cabinet, and the play coordinate value corresponds to the display range of the cabinet. A cabinet label corresponds to two determined coordinate values.

The signal station sends the play coordinate value of the cabinet to the cabinet one by one.

After the signal station completes the coding of each cabinet and assigns the play coordinate value, the signal station outputs the "start cabinet" command to all cabinets.

After receiving the instruction to start the cabinet, the cabinet performs a power-on self-check process, and enters a standby state after the power-on self-check process is completed.

After sending out the "start cabinet" command, the signal station sequentially initiates signal exchanges for assigning play coordinates to the cabinet, and assigns play coordinates to the cabinet.

The signal station sends an "assignment" command to a first cabinet.

The first cabinet will not respond to the assignment command in time when it is in the power-on self-check process. However, when the power-on self-check process ends and the first cabinet enters the standby state, it will respond to the assignment command immediately, and the cabinet will exchange the following information with the signal station through the established information exchange channel.

The cabinet transmits the own cabinet code information to the signal station.

After confirming that the received cabinet code is correct, the signal station sends the play coordinate value information corresponding to the cabinet code to the cabinet.

The signal station inputs a sleep command to the cabinet.

So far, the signal station has finished assigning the play coordinate value to the first cabinet.

According to the above process, a corresponding play coordinate value is assigned to each subsequent cabinet.

When the signal station sends out the "assignment" command, and there is no cabinet to respond to the "assignment" command from the signal station, it means that the signal station has completed the assignment to all the cabinets, or it is only determined according to the program judgment that the assignment to all the cabinets has been completed.

The signal station sends all video information to the cabinets according to the established initialization wireless communication connection.

According to the established initialization wireless communication connection, the signal station outputs a "start cabinet" command to all the cabinets.

The cabinet enters the power-on self-check process according to the start cabinet command, and enters a standby state.

The signal station sends out the "full screen sending and receiving" command to all cabinets, and inputs the following commands to all cabinets:

Read its own play coordinate value.

The video information to be played is the video information covered by the play coordinate value.

Start receiving broadcast video information.

The above commands are sent out late one by one, and the delay interval can be pre-agreed as required. The above commands do not require any feedback from the cabinet.

After the above-mentioned command is issued and the preset delay interval expires, the signal station starts to send video information to the entire cabinet.

The cabinet receives all the video information sent by the signal station, determines the play range according to the play coordinate value, and only plays the video information within the determined play coordinate value range.

It should be noted that, in this text, the terms "including", "include" or any other variation thereof are intended to encompass non-exclusive inclusion, such that a process, method, article or apparatus that includes a series of elements includes not only those elements, but also other elements not expressly listed, or elements inherent to such process, method, article or apparatus. Without further limitation, an element qualified by the phrase "including a . . . " does not preclude the presence of additional identical elements in a process, method, article or apparatus that includes the element.

The embodiments of the present disclosure have been described above in conjunction with the accompanying drawings, but the present disclosure is not limited to the above-mentioned specific embodiments, which are only illustrative, rather than restrictive. Under the inspiration of the present disclosure, those of ordinary skill in the art can also make many forms without departing from the spirit of the present disclosure and the scope protected by the claims, which all belong to the protection of the present disclosure.

What is claimed is:

1. A communication system of a display screen, comprising:
   a signal station; and
   a display screen spliced by a plurality of cabinets,
   wherein the signal station and the plurality of cabinets form a star-shaped communication structure to establish a wireless communication connection for wireless signal transmission of information, and a wireless signal is transmitted wirelessly between the plurality of cabinets;
   the signal station is configured to obtain an initialization information of the cabinet of the display screen;
   the initialization information comprises a cabinet code and a physical installation position of the cabinet; and
   a play coordinate value is assigned to the cabinet of the display screen according to the physical installation position of the cabinet.

2. The communication system of the display screen of claim 1, wherein:
   the signal station is configured to integrate information processing and information transmission, and has the functions of information transmission and information processing;
   the cabinet is configured to implement video broadcast by receiving information; and
   the information comprises control information, video information and/or play coordinate values of the cabinet.

3. The communication system of the display screen of claim 1, wherein the cabinet comprises a wireless communication device provided between the cabinets, and the cabinet and the signal station perform wireless signal communication.

4. The communication system of the display screen of claim 1, wherein the signal station is configured to receive the initialization information of the cabinet of the display screen input manually, and the play coordinate values are assigned to each cabinet according to an order represented by the cabinet code.

5. The communication system of the display screen of claim 1, wherein the signal station is configured to:
   label the cabinets of the display screen one by one;
   obtain the physical installation position of the cabinet according to label information of the cabinet; and
   assign the play coordinate values to the cabinet of the display screen according to the physical installation position of the cabinet of the display screen.

6. The communication system of the display screen of claim 5, wherein the signal station is further configured to:
   obtain label information surrounding the cabinet one by one; and
   fit the label information of each cabinet and the label information of the surrounding cabinets to obtain the physical installation position of the cabinet on the display screen corresponding to the label information.

7. The communication system of the display screen of claim 5, wherein the signal station is further configured to:
   divide the display screen into play areas according to physical installation position information of the cabinet corresponding to the label in the display screen;
   encode each cabinet, and assign a play coordinate value to each cabinet successively; and
   sent the play coordinate value to the corresponding cabinet one by one.

8. The communication system of the display screen of claim 2, wherein:
   the signal station is configured to send all video information to the cabinet through the wireless communication connection; and
   the cabinet is configured to receive all the video information sent by the signal station, determine a play range of the cabinet according to the assigned play coordinate values, and play the video information within the play range.

9. A communication method of a display screen, applied to a signal station, comprising: obtaining, by the signal station, initialization information of a cabinet of a display screen, and establishing a wireless communication connection with each cabinet in a star-shaped communication structure; and
   transmitting a wireless signal between each cabinet of the display screen;
   wherein obtaining, by the signal station, the initialization information of the cabinet of the display screen, and establishing the wireless communication connection with each cabinet in the star-shaped communication structure comprises:
   receiving a cabinet code fed back by the cabinet of the display screen one by one, and labeling the cabinet;
   obtaining a physical installation position of the cabinet according to label information of the cabinet;
   assigning a play coordinate value to the cabinet according to the physical installation position of the cabinet; and
   sending the corresponding play coordinate value to each cabinet one by one.

10. The communication method of the display screen of claim 9, wherein obtaining, by the signal station, the initialization information of the cabinet of the display screen, and establishing the wireless communication connection with each cabinet in the star-shaped communication structure comprises:
    obtaining manually input initialization information of the cabinet of the display screen, the initialization information comprising a cabinet code and a physical installation position of the cabinet;
    dividing the display screen into play areas according to an order represented by the cabinet code, and assigning a play coordinate value to each cabinet spliced into the display screen; and
    sending the corresponding play coordinate values to each cabinet one by one.

11. The communication method of the display screen of claim 9, wherein obtaining the physical installation position of the cabinet according to the label information of the cabinet comprises:
    receiving the label information fed back by each cabinet one by one; and
    fitting the label information of each cabinet and the label information of the surrounding cabinets to obtain the physical installation position of the cabinet on the display screen corresponding to the label information.

12. The communication method of the display screen of claim 9, wherein assigning the play coordinate value to the cabinet according to the physical installation position of the cabinet comprises:
dividing the display screen into play areas according to the physical installation position of the cabinet on the display screen corresponding to the label information; and
encoding each cabinet, and assigning the play coordinate value to each cabinet successively.

* * * * *